F. H. BERGER.
GEARING.
APPLICATION FILED SEPT. 16, 1910.

989,689.

Patented Apr. 18, 1911.
2 SHEETS—SHEET 1.

Witnesses
James P. Barry
Aubrey Pulleyblank

Inventor
Ferdinand H. Berger
By Whittemore Hulbert Whittemore
Attys.

F. H. BERGER.
GEARING.
APPLICATION FILED SEPT. 16, 1910.

989,689.

Patented Apr. 18, 1911.
2 SHEETS—SHEET 2.

Witnesses
James P. Barry
Aubrey Pulleyblank

Inventor
Ferdinand H. Berger
By Whitmore Hulbert Whitmore
Attys.

UNITED STATES PATENT OFFICE.

FERDINAND H. BERGER, OF DETROIT, MICHIGAN, ASSIGNOR TO RUSSEL MOTOR AXLE COMPANY, OF DETROIT, MICHIGAN, A CORPORATION OF MICHIGAN.

GEARING.

989,689.   Specification of Letters Patent.   Patented Apr. 18, 1911.

Application filed September 16, 1910. Seerial No. 582,386.

*To all whom it may concern:*

Be it known that I, FERDINAND H. BERGER, a subject of the Emperor of Germany, residing at Detroit, in the county of Wayne and State of Michigan, have invented certain new and useful Improvements in Gearing, of which the following is a specification, reference being had therein to the accompanying drawings.

The invention relates to drive axles for vehicles such as automobiles in which a compensating gearing is employed for permitting the relative movement of the axle wheel.

It is the object of the invention, first, to obtain a construction of gearing which may be readily removed or replaced as a unit; second, to inclose said removable unit in an oil tight case, and third, to provide within said housing, substantial bearings for the drive shaft and axle shaft.

With these and other objects in view, the invention consists in the construction as hereinafter set forth.

Figure 1:
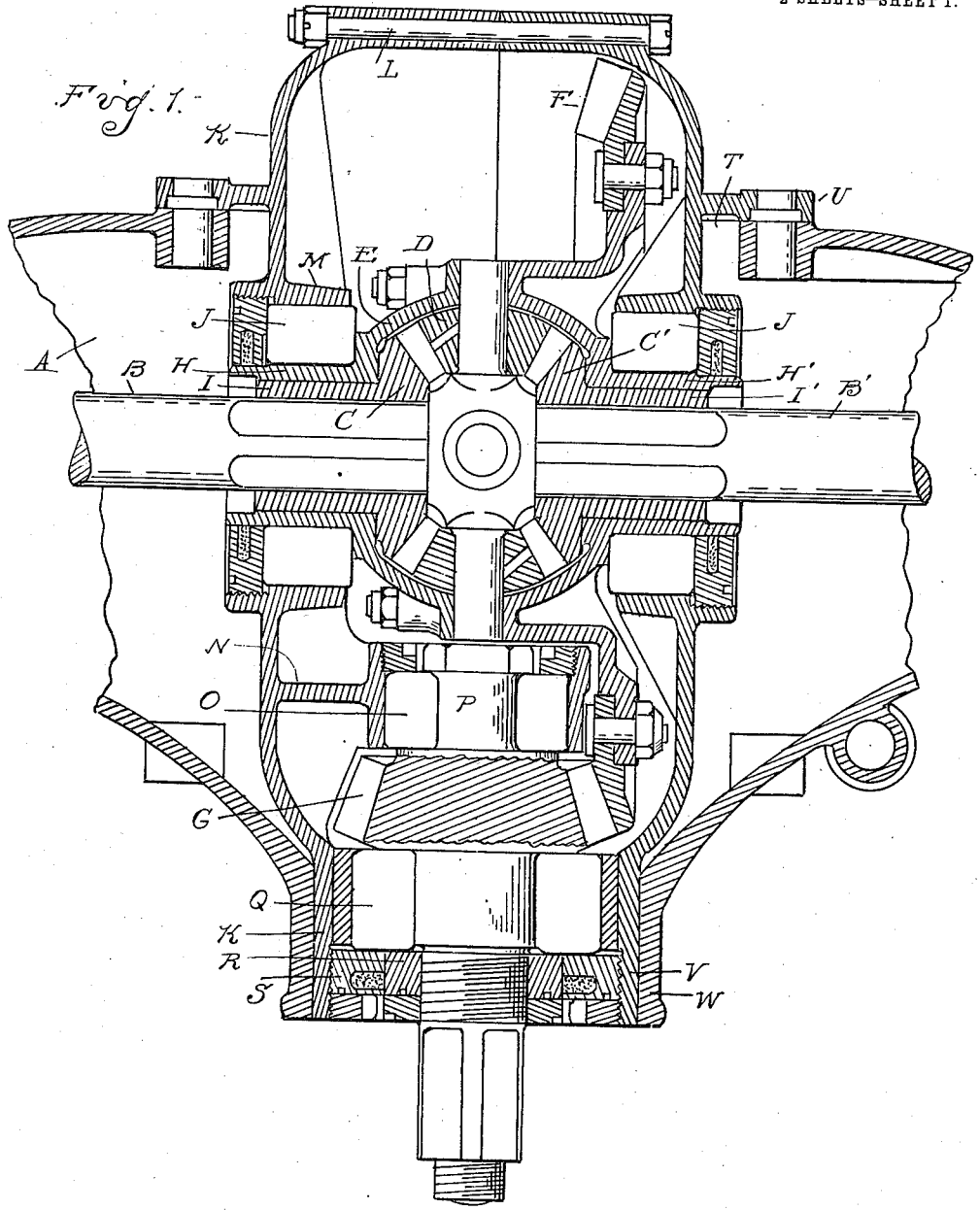
Figure 2:
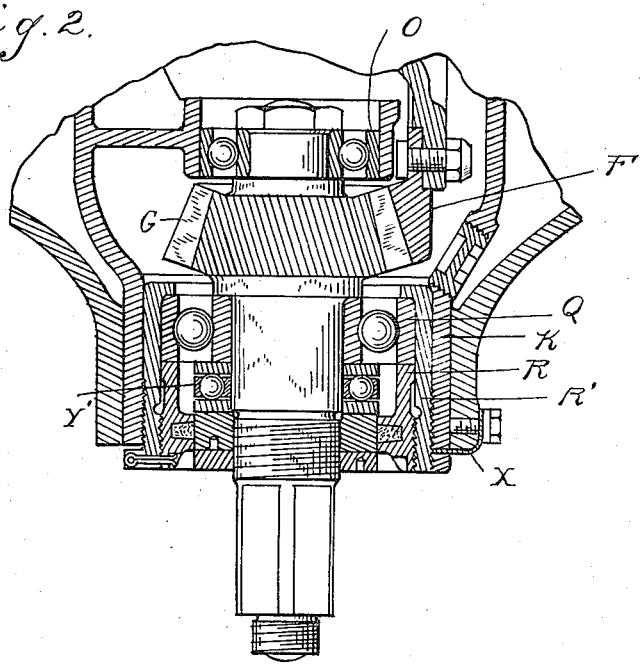

In the drawings,—Figure 1 is a horizontal section through the compensating gearing in the plane of the axle: Fig. 2 is a view of a portion of Fig. 1 showing a slightly modified construction.

A is the axle case which is provided with a central enlarged portion in which the compensating gearing is located. B and B' are the two axle sections within this case, which engage with the compensating gearing by an end-wise movement. The compensating gearing comprises intermeshing beveled gear wheels C, C' and D which are inclosed within a frame E having enlarged beveled gear wheel F. The latter meshes with a beveled pinion G which is driven from the power transmission shaft of the vehicle (not shown).

The frame E is provided with alined tubular portions H, H' which form bearings for the shank I, I', of the gear-wheel C and also journals for the frame and gear wheel F. These journals engage bearings J in an outer housing K which incloses all of the gearing. The housing K is formed in two separable sections dividing in the plane of the axis of the pinion G and these sections are secured to each other by clamping bolts L.

M are annular flanges on the housing sections forming races for the bearings J.

N is a bracket arm extending inward from one of the sections which contains a bearing O for the inner end P of the shaft of the pinion G. This shaft extends outward and engages in outer bearing Q beyond which is a collar R engaging an annular oil and dust cap S having a threaded engagement with the housing K.

The whole housing K is of such form that it may be inserted through an aperture T in the rear of the casing A, and a flange U— preferably integral with the housing—forms a closing cap for said aperture, and a means for securing the housing rigidly thereto. The forward end of the housing is provided with a neck portion V, which engages a corresponding neck bearing W in the axle case.

The construction as described is one that may be removable from or engaged with the axle case as a unit, it being only necessary to remove the clamping nuts for the flange U and to withdraw the axle sections B B' endwise so as to disengage the same from the pinions C C'. The casing is not only just removable, but forms when removed an oil-tight housing inclosing all of the parts of the mechanism; thus, detachment for adjustment or repair is greatly facilitated.

The important feature of the construction is the manner of forming the bearings for the pinion G. This provides double bearing with the two sections on opposite sides of the pinion and both being preferably of the roller or ball type. Roller bearings are also provided for the axle sections.

In Fig. 2 a construction is illustrated in which the pinion and the journal bearings on opposite sides thereof are removable and adjustable as a unit. In this construction the collar R, instead of directly engaging the casing K, has a threaded engagement with a sleeve R', and the latter is threaded to engage the housing. The sleeve R' also carries the roller or ball bearing Q, and the inner roller or ball bearing O is connected to move longitudinally with the shaft of the pinion G. Thus, whenever it is desired to remove the pinion, by unscrewing the sleeve R' both ball bearings and the pinion will be drawn out of the housing. The construction may further be used to adjust the pinion G in relation to the gear wheel by screwing the sleeve R' in or out of the housing. Any suitable locking means, such as a spring latch X, may be employed for holding the sleeve when adjusted. The ball thrust bearing Y' is also preferably introduced between the bearing Q and the collar R.

What I claim as my invention is:

1. The combination with an axle case, of a compensating gearing insertible in and removable from said case as a unit, said removable unit including the housing for the parts.

2. The combination with an axle case, of a compensating gearing insertible in and removable from said case as a unit and including an oil tight housing inclosing the parts.

3. The combination with an axle case, of a compensating gearing, and a housing for said gearing formed of separable sections inclosing all of the parts to form a removable unit.

4. The combination with an axle casing, of a compensating gearing including a beveled pinion for axial alinement and engagement with the power transmission shaft, and a housing for said gearing forming a bearing for said pinion.

5. The combination with an axle casing, of a compensating gearing insertible in and removable from said casing as a unit, and a housing for said gearing formed in sections separable in a central plane transverse to the axle.

6. The combination with an axle case, of a compensating gearing insertible in and removable from said case as a unit, a housing for said removable unit formed in sections separable centrally in a plane transverse to the axle, and bearings within said housing for the axle and drive shaft.

7. The combination of a compensating gearing, an oil tight housing inclosing said gearing, and an axle case having an aperture therein through which said housing and contained gearing are insertible and removable.

8. The combination of a compensating gearing, a housing inclosing said gearing formed of two symmetrical sections meeting in a plane transverse to the axle, and an axle case apertured to receive said housing and contained gearing.

9. The combination of a compensating gearing including a drive pinion having its axis perpendicular to that of the axle, a housing inclosing said gearing formed of two symmetrical sections meeting in the plane of the axis of said pinion, and bearings for said pinion on opposite sides thereof formed by said housing, and an axle case apertured to receive said housing and inclosed gearing.

10. The combination of an axle case, having a forward neck portion for the propeller shaft and an aperture in rear in alinement with said neck portion, a compensating gearing, and a housing inclosing said gearing insertible through said rear aperture and seated and clamped at its forward end in said neck portion.

11. The combination of an axle case, having a forwardly extending neck portion and an aperture in the rear in alinement with said neck portion, a compensating gearing, and a housing for said gearing insertible through said rear aperture into engagement with said neck portion, the rear portion of said housing forming an oil-tight cap or closure for said aperture.

12. The combination of an axle case, having a forwardly projecting neck portion and an aperture in the rear in alinement with said neck portion, a compensating gearing, and a housing for said gearing insertible through said aperture into engagement with said neck portion and having a flange secured to said case at the margin of said aperture.

13. The combination of an axle case, having a forwardly extending neck portion and an integral rear portion apertured in alinement with said neck portion, a compensating gearing, and a housing for said gearing insertible through said aperture into engagement with said neck portion, said housing having near its rear end an annular flange, and means for securing said flange to said case at the margin of said aperture.

14. The combination with an axle case, having a forwardly projecting neck portion and an integral rear portion apertured in alinement with said neck portion, of a compensating gearing and a housing for said gearing formed in two symmetrical sections insertible as a unit through said aperture into engagement with said neck portion, said sections being provided with laterally projecting flanges for securing to said case and forming an oil-tight closure for said aperture.

15. The combination with an axle case, having forwardly projecting neck portion, a compensating gearing, a housing for said gearing insertible through said aperture into engagement with said neck portion, and having an annular flange at the rear, a securing means for said flange to said case and also holding said housing in position within said case.

16. The combination with a compensating gearing, of a housing inclosing said gearing, a pinion and coöperating gear within said housing forming a drive connection, and bearings for said pinion on opposite sides thereof insertible and removable therewith as a unit from said housing.

17. The combination with a compensating gearing, of a housing therefor having a forwardly projecting neck portion, a drive pinion, and bearings for said pinion on opposite sides thereof, said pinion and its bearings being insertible in and removable from said neck portion as a unit.

18. The combination with a compensating gearing, of a housing therefor, having a neck portion, a pinion and journal bearings therefor insertible and removable from said neck portion as a unit, a gear wheel within said housing meshing with said pinion, and means for longitudinally moving said pinion and bearings to adjust the former in relation to said gear wheel.

19. The combination with an axle case, of a housed compensating gearing insertible in and removable from said case as a unit, and a drive pinion and journal bearings independently insertible and removable from said housing.

20. The combination with an axle case having an aperture therein, of a compensating gearing, and a housing for said gearing insertible through said aperture and having a portion forming a closure therefor.

In testimony whereof I affix my signature in presence of two witnesses.

FERDINAND H. BERGER.

Witnesses:
W. J. BELKNAP,
JAMES P. BARRY.